B. C. SEATON.
TIRE SECURING DEVICE.
APPLICATION FILED OCT. 16, 1909.
1,140,487.
Patented May 25, 1915.
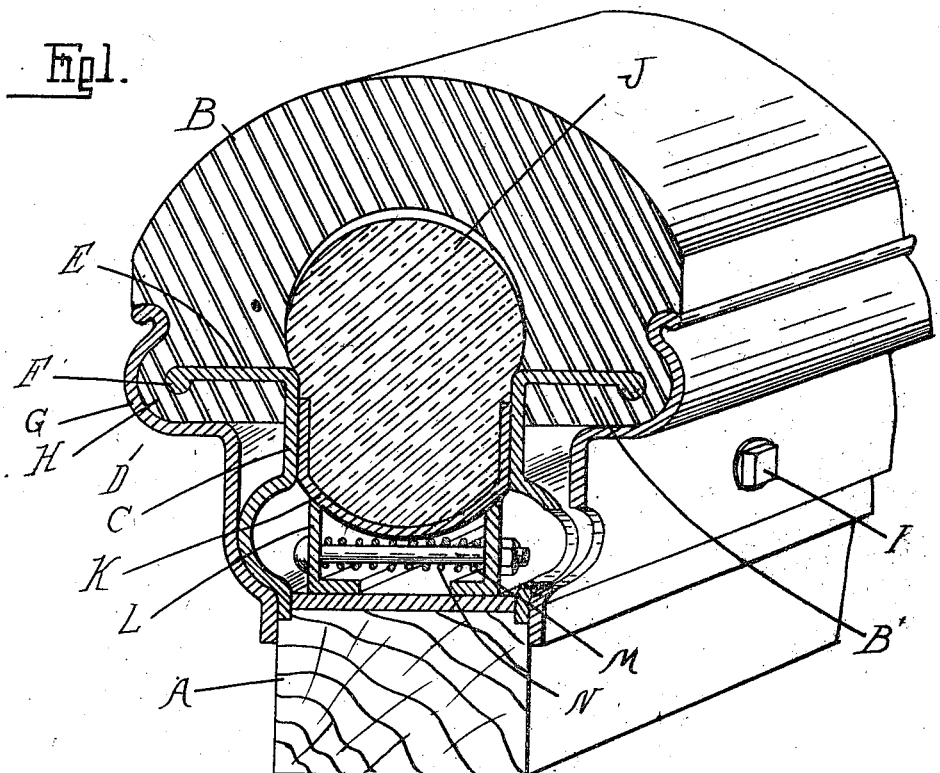
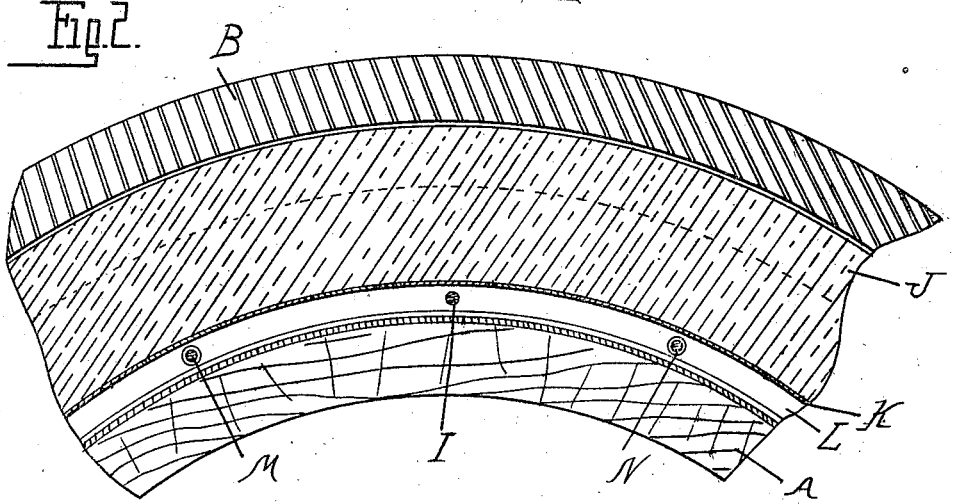
Witnesses
Inventor
Benjamin Coplin Seaton
By Whitmore, Hulbert & Whittemore
Attorneys

UNITED STATES PATENT OFFICE.

BENJAMIN COPLIN SEATON, OF DETROIT, MICHIGAN.

TIRE-SECURING DEVICE.

1,140,487.

Specification of Letters Patent.

Patented May 25, 1915.

Application filed October 16, 1909. Serial No. 523,029.

*To all whom it may concern:*

Be it known that I, BENJAMIN COPLIN SEATON, a citizen of the United States of America, residing at Detroit, in the county of Wayne and State of Michigan, have invented certain new and useful Improvements in Tire-Securing Devices, of which the following is a specification, reference being had therein to the accompanying drawings.

The invention relates to vehicle tires, of that type known as cushion tires, and it is the object of the invention, first, to obtain a construction in which the tension of the cushion may be readily adjusted; further, to provide means for readily assembling or dismounting the tire.

To this end, the invention consists in various features of construction, as hereinafter set forth.

In the drawings,—Figure 1 is a sectional perspective view of the tire; and Fig. 2 is a longitudinal section thereof.

A is the felly of a vehicle wheel, of any suitable construction. Upon this felly is mounted a supporting base for the tire case B, said base being preferably formed of structural steel members C and D. As shown, the member C is provided with an outwardly extending annular flange E, terminating in a rounded bead F, and this flange and bead are adapted to engage a slit in the tire case B. The outer member D is formed with a suitably fashioned portion G for engaging and holding the bead H on the tire case. Both members C and D are secured to the felly A by cross-bolts I, which when secured clamp the parts firmly in place.

The resilient member or cushion for the tire is in the form of an inner annular member J which engages the groove or recess in the outer case B. This member J is seated upon a sectional rim K which is arranged between the members C. The sections K are seated upon annular members L, preferably of an angular cross section and engaging the periphery of the felly A. The construction is such that by moving the members L inward or toward each other the members K will be forced outward, thereby enlarging the diameter of the resilient member J and forcing it against the outer case B.

M is a clamping screw engaging the members L, by which the latter are adjusted toward each other, and N is a spring sleeved upon the bolt M and tending to separate the rings L. The members C and D are cut away opposite the bolt M so as to permit of adjusting the same at any time.

The parts being constructed as described, the tire may be assembled by first engaging the member J with the case B, and then placing in position the members K and L. The case member B may be engaged with the members C and D on one side of the wheel by slipping the rings L over the felly A, after which the members C and D for the opposite side of the wheel are placed in position. It will be noted that the member C may be engaged with the case B by turning back the flap portions B' which passes beneath the flange E. After the parts are assembled, the bolts I are engaged to clamp all of the parts in position.

During the assembling of the parts the rings L are separated from each other a sufficient distance to relieve all tension from the member J, but after the parts are secured in position the bolts M are tightened, moving the members L inward toward each other, and thereby forcing the sections of the rim K radially outward and expanding the member J. This will place a tension against the outer case, which may be increased or diminished as desired.

What I claim as my invention is,—

The combination with a felly, of side plates secured thereto having upwardly and outwardly-extending portions, a tire positioned intermediate of said side plates and seated upon the outwardly-extending portions thereof, inner plate members positioned upon opposite sides of the felly intermediate of said side plates and having upwardly and outwardly-extending portions, said outwardly extending portions extending above and being spaced from said side plate extensions and being embedded in the tire for clamping the latter to the extensions.

In testimony whereof I affix my signature in presence of two witnesses.

BENJAMIN COPLIN SEATON.

Witnesses:
NELLIE KINSELLA,
JAMES P. BARRY.